No. 891,655. PATENTED JUNE 23, 1908.
T. A. BAKER.
VEHICLE WHEEL.
APPLICATION FILED APR. 2, 1907.

2 SHEETS—SHEET 1.

Witnesses:

Inventor
Thomas A. Baker
By James L. Norris
Atty.

No. 891,655.
PATENTED JUNE 23, 1908.
T. A. BAKER.
VEHICLE WHEEL.
APPLICATION FILED APR. 2, 1907.
2 SHEETS—SHEET 2.
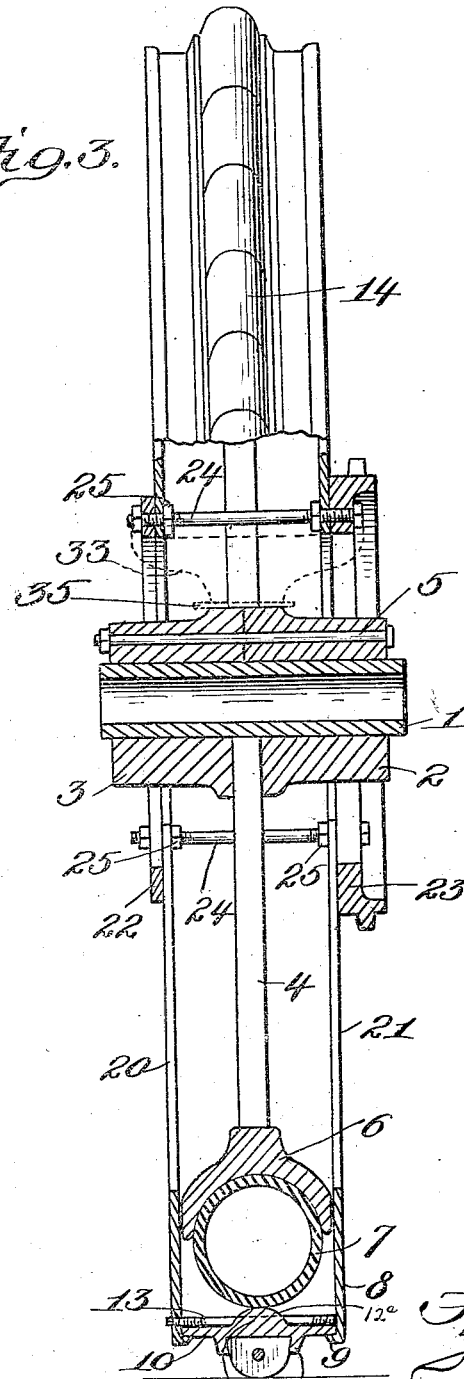
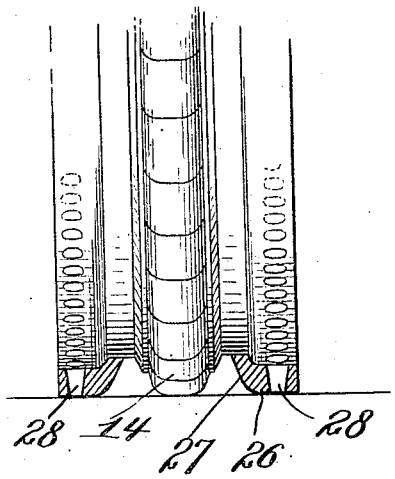
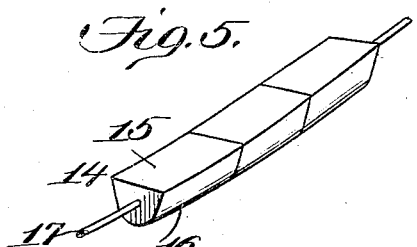
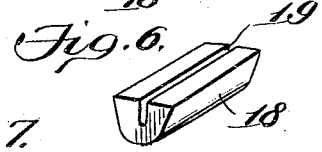
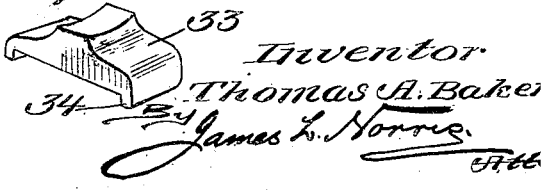

UNITED STATES PATENT OFFICE.

THOMAS A. BAKER, OF RENICK, MISSOURI.

VEHICLE-WHEEL.

No. 891,655.

Specification of Letters Patent.

Patented June 23, 1908.

Application filed April 2, 1907. Serial No. 365,978.

*To all whom it may concern:*

Be it known that I, THOMAS A. BAKER, a citizen of the United States, residi- Renick, in the county of Randolph and of Missouri, have invented new and useful Improvements in Vehicle-Wheels, of which the following is a specification.

This invention relates to "vehicle wheels," more particularly adapted for use in connection with motor or other vehicles; and the object thereof is to construct a vehicle wheel in a manner as hereinafter set forth, which will embody all of the advantages of a pneumatic or cushioned wheel and at the same time tired in any suitable manner so as to prevent the puncturing, injuring or wearing out of the cushion, whether the cushion be a solid or pneumatic one, and by such construction of wheel the longevity thereof is obtained.

A further object of the invention is to provide a vehicle wheel with a mud guard in a manner as hereinafter set forth, which will overcome the slipping of the wheel when traveling over muddy road-beds.

A further object of the invention is to construct a vehicle wheel in a manner as hereinafter set forth with means to allow of the shifting of the wheel hub to an eccentric position with respect to the axis of the driving means for the wheel without changing the position of such driving means.

Further objects of the invention relate to the constructing of a vehicle wheel embodying all the advantages of a pneumatic or cushioned wheel, and which shall be simple in its construction, strong, durable, readily set up and comparatively inexpensive to manufacture.

With the foregoing and other objects in view the invention consists of the novel construction, combination and arrangement of parts hereinafter more specifically described and illustrated in the accompanying drawings wherein is shown the preferred embodiment of a vehicle wheel in accordance with this invention, but it is to be understood that changes, variations and modifications can be resorted to which come within the scope of the claims hereunto appended.

In describing the invention in detail reference is had to the accompanying drawings, wherein like characters denote corresponding parts throughout the several views, and in which—

Figure 1:
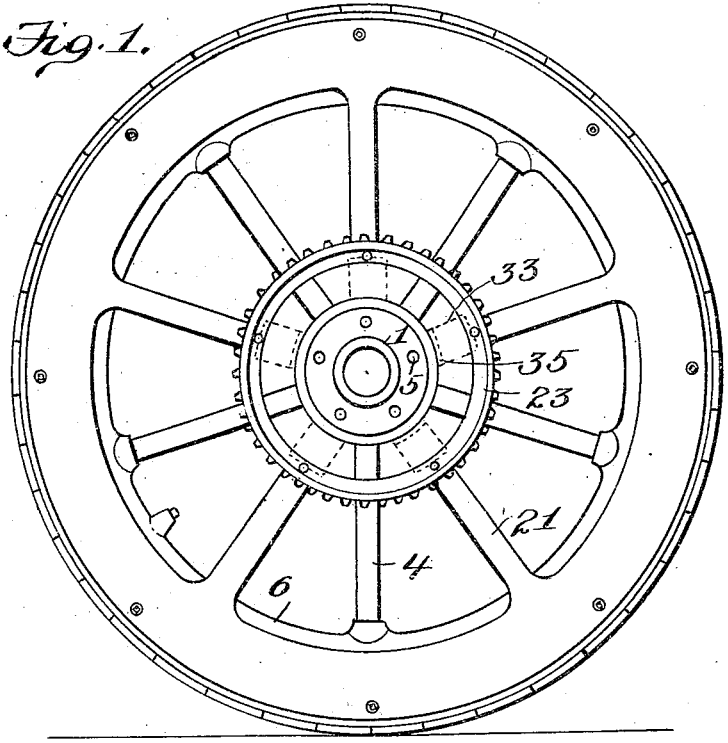
Figure 2:
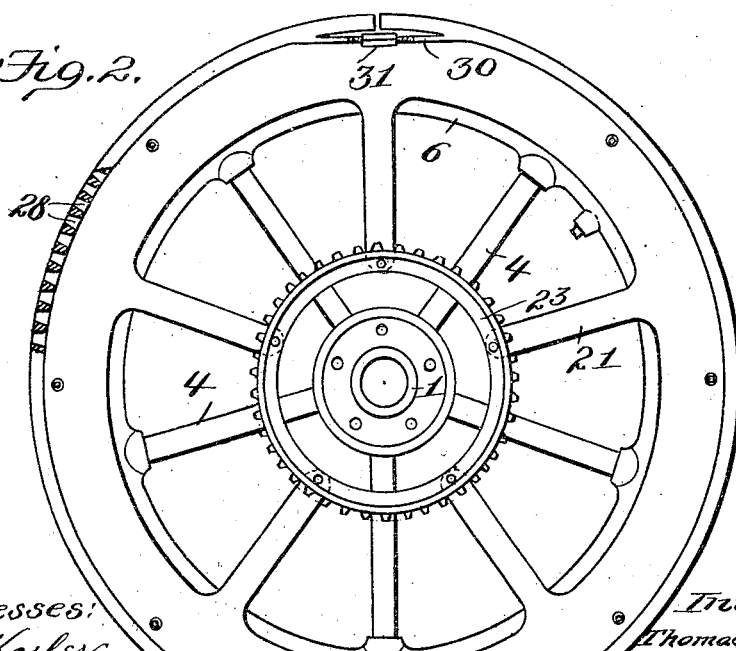

Figure 1 is a side elevation of a vehicle wheel in accordance with this invention without the mud guard; Fig. 2 is a like view with the mud guard attached; Fig. 3 is a sectional front elevation of a vehicle wheel in accordance with this invention with the mud guard removed; Fig. 4 is a front view of a portion of the wheel with the mud guard in section; Fig. 5 is a perspective view of a portion of the tire, and, Fig. 6 is a detail showing the tire-locking plug. Fig. 7 is a perspective view of a filling block.

Referring to the drawings by reference characters, 1 denotes the axle box which is inserted into the hub, the latter being formed of two sections 2, 3, between which are clamped the spokes 4. Bolts 5 are provided which extend through the sections 2—3 of the hub for clamping them around the spokes 4. These latter at their free ends are secured to a cup-shaped rim 6 which constitutes a means for receiving a pneumatic tire 7, the latter constituting the cushioning element of the wheel.

Positioned at each side of the rim 6 is a broad, flat ring 8, the outer edge thereof inturned as at 9 so as to form a flange constituting a seat for the circular band or rim 10. This latter has its outer face formed with a pair of circumferentially-extending flanges 11 which are suitably spaced apart and have the inner faces thereof inclined inwardly, as at 12. The inner face of the band or rim 10, approximately centrally thereof, is offset, as at 12ª, such offset being substantially convex in cross section and which is adapted to bear against the tube 7, or in other words, the tube 7 is confined between the cup-shaped rim 6 and the offset portion 12ª within the rings 8.

The rings 8 are clamped together by the hold-fast devices 13. These latter also act as a means for clamping the band or rim 10 to the rings 8.

The flanges 11 form a circumferentially-extending channel upon the outer face of the band or rim 10 for receiving the wheel tire. The said tire consists of a series of blocks 14 having the inner face flattened, as at 15 and the outer face rounded as at 16. These blocks are of any suitable material, preferably wood and are strung upon a wire strand 17, openings being provided in the blocks 14 for such purpose. The tire furthermore comprises a locking plug 18 which is of the same contour as the blocks 14, but is provided with a slot 19. After the blocks 14 have been arranged circumferentially around the band or rim 10 within the channel formed by the flanges 11 the block 18 is then positioned in the channel and, as the fit between the block 18 and a pair of blocks 14 is to be unusually snug, it will be evident that the block 18 will lock the tire-forming blocks in position, and further constitute one of the tire-forming blocks.

Projecting from the inner edge of each of the rings 8 towards the hub is a series of spokes, one series being indicated by the reference character 20 and the other by the reference character 21. The inner ends of the spokes of the series 20 are connected to a flat ring 22 which surrounds the hub of the wheel at a point removed therefrom, and the inner ends of the spokes of the series 21 are connected to a sprocket wheel 23, which constitutes the driving element for the vehicle wheel and which surrounds the hub at a point removed therefrom. The spokes 20 and 21 are connected to the ring 22 and wheel 23 through the medium of a series of bolts 24 carrying the clamping nuts 25. These latter not only connect the spokes 20, 21 to the ring 22 and wheel 23, but also act as a means to retain the spokes 20, 21 a suitable distance apart.

In Figs. 2 and 4 the wheel is shown as provided with mud guards each of which consists of a pair of sem-circular members 26 and which when secured to the wheel is of a diameter equal to the diameter of the wheel when tired. Each of the members 26 is provided with an inwardly-extending portion 27 adapted to take over the flanged outer portion 9 of a ring 8. By such an arrangement the guards are prevented from slipping off the wheel. Each of the guards is provided with a series of openings which extend throughout the same and these openings are of inverted cone-shape and indicated by the reference character 28—that is to say, the openings are of such shape that the outer ends thereof will be of less diameter than the inner ends thereof. When the guards are in position they project laterally from the wheel so that the mud taken up by the openings will drop from the openings during the revolution of the wheel. This is evident owing to the shape of the openings. By the arrangement of the guards in a manner as stated during the travel of the wheel, and owing to the passage of the mud through the openings, the wheel will be prevented from slipping.

Each pair of members 26 is hinged together at one end, as at 29 and the other ends of the pair of members are connected together by a pair of screw-threaded rods 30 carrying a turn-buckle 31. The screw-threaded rods 30 and turn-buckle 31 act as a means for detachably securing the guard to the wheel.

From the foregoing construction of wheel it is evident that when the wheel meets with an obstruction, or when pressure is applied thereto a cushioning action will be had, and in this connection it will be stated that although the hub may be shifted to a position eccentric with respect to the axis of the driving sprocket, yet there will be no shifting of the sprocket.

From the construction of the wheel the weight of the car or vehicle is so disposed that it is suspended on the upper half and supported upon the lower half of the cushioning element instead of resting upon a few inches of the cushioning element as would be the case if the same were employed as the tire. Such an advantage increases the life of the cushioning element, which would not be the case if the weight of the car or vehicle was not suspended in a manner as stated, and, furthermore, by such arrangement it also tends to materially assist in obtaining the cushioning function of the wheel as will be evident.

By setting up the tire of a series of closely-abutting separate elements or blocks, it is evident that if a block should be injured it could be removed and a new one replaced so under such circumstances it would not be necessary to discard the tire as a whole. This makes the tiring of the wheel unusually economical.

In Fig. 7 of the drawings a filling block is disclosed which is indicated by the reference character 33. A plurality of blocks 33 is employed for the purpose of jacking up the wheel so as to form a solid one if the cushioning element 7 collapses. Such action would cause the rim 6 to come down against the bolts 13. The filling blocks 33 are interposed between the hub and take over the elements 22 and 23. For such purpose the filling blocks are formed with an offset at each end as at 34. The position of the filling blocks when jacking up the wheel is shown in dotted lines in Figs. 1 and 3. If the cushioning element 7 should collapse one of the filling blocks 33 is placed upon the top of the hub and against the elements 22 and 23; the wheel is then turned and another block inserted and such operation is continued until the desired number of blocks has been positioned. Between the last block and the hub a wedge 35 is driven (see Fig. 3) and the operation is completed, making thereby a substantially solid wheel.

What I claim is—

1. A vehicle wheel provided with a cushioning element interposed between the wheel rim and the hub, a tire secured to the rim approximately centrally thereof and consisting of a series of closely-abutting blocks strung upon a flexible member, and a mud guard detachably secured to each side of the wheel rim and each of which is of a diameter equal to the diameter of the tired wheel.

2. A vehicle wheel provided with a cushioning element interposed between the wheel rim and the hub, a tire secured to the rim approximately centrally thereof and consisting of a series of closely-abutting blocks strung upon a flexible member, and a mud guard detachably secured to each side of the wheel rim, each of said guards provided with a series of conical-shaped openings.

3. A vehicle wheel provided with a cushioning element interposed between the wheel rim and the hub, a tire secured to the rim approximately centrally thereof and consisting of a series of closely-abutting blocks strung upon a flexible member, and a mud guard detachably secured to each side of the wheel rim and each of which is of a diameter equal to the diameter of the tired wheel, and each of said guards provided with a series of conical-shaped openings.

4. A vehicle wheel comprising a hub, spokes secured thereto, a rim carried by the spokes, a cushioning means seated in the rim, a wheel rim bearing against said cushioning means, a pair of rings for retaining the wheel rim in position, spokes extending inwardly from said rings, a ring surrounding the hub at a point removed therefrom, a sprocket wheel surrounding the hub at a point removed therefrom, means for connecting the last-mentioned spokes to the last mentioned ring and sprocket wheel, and a tire secured to the wheel rim.

5. A vehicle wheel embodying a hub, a driving means independent of the hub, a rim, a cushioning element interposed between the hub and the rim, said rim provided with a pair of circumferentially-extending flanges suitably spaced apart, each of said flanges arranged at a point removed from the side edges of the rim, and a tire detachably secured by said flanges to the rim, said tire of less width than the width of the rim.

6. A vehicle wheel provided with a pneumatic cushioning element interposed between the wheel rim and the hub, means independent of the hub for retaining the cushioning means in position, transversely extending means interposed between the retaining means and hub for jacking up the elements of the wheel when the cushioning means collapses, thereby forming a rigid structure, said transversely extending means cut away to provide a seat for the retaining means and having the intermediate portion of its inner face seated upon the hub.

In testimony whereof I have hereunto set my hand in presence of two subscribing witnesses.

THOMAS A. BAKER.

Witnesses:
GEO. CAPPARD, Jr.,
R. F. KEELEY.